(12) United States Patent
Rossignol et al.

(10) Patent No.: US 8,265,158 B2
(45) Date of Patent: Sep. 11, 2012

(54) MOTION ESTIMATION WITH AN ADAPTIVE SEARCH RANGE

(75) Inventors: Francois Rossignol, Montreal (CA); Chon Tam Ledinh, Montreal (CA); Thi Thuy-Ha Tran, Hue (VN)

(73) Assignee: Qualcomm Incorporated, San Diego, CA (US)

( * ) Notice: Subject to any disclaimer, the term of this patent is extended or adjusted under 35 U.S.C. 154(b) by 688 days.

(21) Appl. No.: 12/338,960

(22) Filed: Dec. 18, 2008

(65) Prior Publication Data
US 2009/0161763 A1 Jun. 25, 2009

Related U.S. Application Data

(60) Provisional application No. 61/015,226, filed on Dec. 20, 2007.

(51) Int. Cl.
*H04N 7/12* (2006.01)
(52) U.S. Cl. .............................. 375/240.16; 375/240.17
(58) Field of Classification Search ............. 375/240.16, 375/240.17, 240.01, 240.12
See application file for complete search history.

(56) References Cited

U.S. PATENT DOCUMENTS

| | | | |
|---|---|---|---|
| 5,057,921 A | 10/1991 | Robert et al. | |
| 5,610,658 A | 3/1997 | Uchida et al. | |
| 5,754,237 A | 5/1998 | Jung | |
| 6,005,639 A | 12/1999 | Thomas et al. | |
| 6,011,596 A | 1/2000 | Burl et al. | |
| 6,130,912 A | 10/2000 | Chang et al. | |
| 6,160,850 A | 12/2000 | Chen et al. | |
| 6,219,436 B1 | 4/2001 | De Haan et al. | |
| 6,222,882 B1 | 4/2001 | Lee et al. | |
| 6,263,089 B1 * | 7/2001 | Otsuka et al. | 382/107 |
| 6,487,313 B1 | 11/2002 | De Haan et al. | |

(Continued)

FOREIGN PATENT DOCUMENTS

EP 0 647 919 A1 4/1995

(Continued)

OTHER PUBLICATIONS

PCT International Search Report and the Written Opinion mailed Jun. 16, 2009, in related International Application No. PCT/US08/13942.

(Continued)

*Primary Examiner* — Christopher Brown
*Assistant Examiner* — Fahimeh Mohammadi
(74) *Attorney, Agent, or Firm* — Haynes and Boone, LLP

(57) ABSTRACT

A method and apparatus for estimating motion of a pixel block in a first frame, the method including searching a first area in a second frame to identify a first matching block that corresponds to the pixel block, the first matching block including a first error value that is a minimum of at least one error criteria between the pixel block and the first matching block, calculating a first motion vector associated with the first matching block. The method further including searching a second area in the second frame to identify a second matching block that corresponds to the pixel block, the second matching block including a second error value that is a minimum of the at least one error criteria between the pixel block and the second matching block, calculating a second motion vector associated with the second matching block and selecting a final motion vector between the first and second motion vectors based on the first and second error value.

7 Claims, 10 Drawing Sheets

U.S. PATENT DOCUMENTS

| | | | |
|---|---|---|---|
| 6,625,333 | B1 | 9/2003 | Wang et al. |
| 6,876,703 | B2 * | 4/2005 | Ismaeil et al. ........... 375/240.16 |
| 6,914,938 | B2 * | 7/2005 | Zhang et al. ............. 375/240.16 |
| 7,039,109 | B2 | 5/2006 | Pelagotti et al. |
| 7,058,227 | B2 | 6/2006 | De Haan et al. |
| 7,489,821 | B2 * | 2/2009 | Fisher et al. ................. 382/199 |
| 7,933,769 | B2 * | 4/2011 | Bessette ........................ 704/219 |
| 8,064,522 | B2 * | 11/2011 | Kondo et al. ............ 375/240.16 |
| 8,130,845 | B2 * | 3/2012 | Brusnitsyn et al. ...... 375/240.28 |
| 2003/0072373 | A1 * | 4/2003 | Sun .......................... 375/240.16 |
| 2004/0246374 | A1 | 12/2004 | Mishima et al. |
| 2005/0025342 | A1 | 2/2005 | Lee et al. |
| 2005/0135485 | A1 | 6/2005 | Nair et al. |
| 2006/0072790 | A1 | 4/2006 | Wittebrood et al. |
| 2006/0136402 | A1 * | 6/2006 | Lee .................................... 707/3 |
| 2007/0036213 | A1 * | 2/2007 | Matsumura et al. ..... 375/240.03 |
| 2007/0121725 | A1 | 5/2007 | Li |
| 2007/0291843 | A1 * | 12/2007 | Chappalli et al. ........ 375/240.16 |
| 2008/0074350 | A1 | 3/2008 | Beon et al. |
| 2008/0084934 | A1 * | 4/2008 | Agrawal .................. 375/240.27 |
| 2008/0137747 | A1 | 6/2008 | Yamasaki et al. |
| 2008/0159630 | A1 * | 7/2008 | Sharon et al. ................. 382/199 |
| 2008/0204592 | A1 * | 8/2008 | Jia et al. ...................... 348/402.1 |
| 2008/0247461 | A1 * | 10/2008 | Nishida ................... 375/240.03 |
| 2008/0285650 | A1 * | 11/2008 | Chappalli ................ 375/240.16 |
| 2008/0317129 | A1 | 12/2008 | Lertrattanapanich et al. |
| 2009/0087120 | A1 | 4/2009 | Wei |
| 2009/0135913 | A1 | 5/2009 | Nair et al. |
| 2009/0161010 | A1 | 6/2009 | Tran et al. |
| 2010/0128126 | A1 | 5/2010 | Takeuchi |
| 2010/0253835 | A1 | 10/2010 | Zhou et al. |
| 2010/0290532 | A1 | 11/2010 | Yamamoto et al. |
| 2010/0329344 | A1 | 12/2010 | Hayase et al. |
| 2011/0216240 | A1 | 9/2011 | Ohno |
| 2011/0216831 | A1 | 9/2011 | Rossignol et al. |

FOREIGN PATENT DOCUMENTS

| | | | |
|---|---|---|---|
| EP | 1587032 | A1 | 10/2005 |
| EP | 1855474 | A1 | 11/2007 |
| EP | 1 885 129 | A2 | 2/2008 |
| EP | 1 885 132 | A2 | 2/2008 |
| EP | 1 885 129 | A3 | 7/2008 |
| GB | 2279531 | A | 1/1995 |
| WO | WO9120155 | A1 | 12/1991 |
| WO | WO0249365 | A2 | 6/2002 |

OTHER PUBLICATIONS

Jozawa et al., "*Two-Stage Motion Compensation Using Adaptive Global MC and Local Affine MC*", IEEE Transactions on Circuits and Systems for Video Technology, vol. 7, No. 1. pp. 75-85; Feb. 1997.

International Preliminary Report on Patentability mailed Jul. 1, 2010, in related International Application No. PCT/US2008/013942.

Chen, Tao, "Adaptive Temporal Interpolation using bidirectional Motion Estimation and Compansation", IEEE ICIP 2002, vol. 2, Sep. 22, 2002 pp. 313-316, 2002.

Choi, Byeong-Doo, et al., "Motion-Compensated Frame Interpolation Using Bilateral Motion Compensation and Adaptive Overlapped Block Motion Compensation", IEEE Transactions on Circuits and Systems for Video Technology, vol. 17, No. 4, Apr. 2007, pp. 407-416.

De Haan, G., "IC for Motion-Compensated De-Interlacing, Noise reduction and Picture Rate Conversion", IEEE Trans. On CE, vol. 45, No. 3, Aug. 1999.

Jeon, et al., "Coarse-to-Fine Frame Interpolation for Frame Rate Up-Conversion Using Pyramid Structure", IEEE Transactions on Consumer Electronics, vol. 49, No. 3, Aug. 2003, pp. 499-508.

Kang, Suk Ju, et al., "Frame Rate Up-Conversion with Bidirectional Sub-Sampled Block Motion Estimation and Minimum Deviation Filter", International Conference on New Exploratory Technologies, Oct. 25, 2007.

Lee, et al., "Hierarchical Motion-Compensated Frame Interpolation Based on the Pryramid Structure", Y. Zhuang et al. (Eds.): PCM 2006, LNCS 4261, 2006, pp. 211-220, ©Springer-Verlag, Berlin Heidelberg.

R. Thoma et al.: "Motion compensating interpolation considering covered and uncovered background", Signal Processing: Image Compression 1, pp. 191-212, 1989.

Sugiyama, K., Aoki, T. & Hangai, S., "Motion Compensated Frame Rate Conversion Using Normarized Motion Estimation", 2005 IEEE Workshop on Signal Processing Systesm—Design and Implementation (SiPS 2005), Athens, Greece.

\* cited by examiner

MOTION ESTIMATION WITH AN ADAPTIVE SEARCH RANGE

RELATED APPLICATIONS

This application claims the benefit of U.S. Provisional Application No. 61/015,226, filed Dec. 20, 2007, the contents of which is herein incorporated by reference in its entirety.

TECHNICAL FIELD

This invention relates generally to the field of video and image coding and, more particularly, to methods and systems for motion estimation and compensation.

DISCUSSION OF RELATED ART

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, the use of digital video coding techniques have gained popularity.

Visual information plays an important role in almost all areas of life. Due to the vast amount of data associated with images and video, video coding is a key technology. Motion estimation and compensation play a key role in various video coding schemes. Motion estimation can be used in a variety of video applications such as compression, noise reduction, scan conversion as well as image interpolation for frame/field rate conversion.

However, with the breakneck speed at which mobile communications and the internet have developed, current motion estimation and compensation schemes have not been able to keep pace with the ever increasing demand of applications such as video streaming over the Internet or mobile videophones.

Therefore, there is a need for more efficient motion estimation and compensation in video coding and compression schemes.

SUMMARY

Consistent with some embodiments of the present invention, a method for estimating motion of a pixel block in a first frame includes searching a first area in a second frame to identify a first matching block that corresponds to the pixel block, the first matching block including a first error value that is a minimum of at least one error criteria between the pixel block and the first matching block, calculating a first motion vector associated with the first matching block.

The method further includes searching a second area in the second frame to identify a second matching block that corresponds to the pixel block, the second matching block including a second error value that is a minimum of the at least one error criteria between the pixel block and the second matching block, calculating a second motion vector associated with the second matching block and selecting a final motion vector between the first and second motion vectors based on the first and second error value.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

The accompanying drawings, which are incorporated in and constitute a part of this specification, illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

In the following description and claims, the terms "coupled" and "connected," along with their derivatives, may be used. It should be understood that these terms are not intended as synonyms for each other. Rather, in particular embodiments, "connected" and/or "coupled" may be used to indicate that two or more elements are in direct physical or electronic contact with each other. However, "coupled" may also mean that two or more elements are not in direct contact with each other, but yet still cooperate, communicate, and/or interact with each other.

Figure 1:
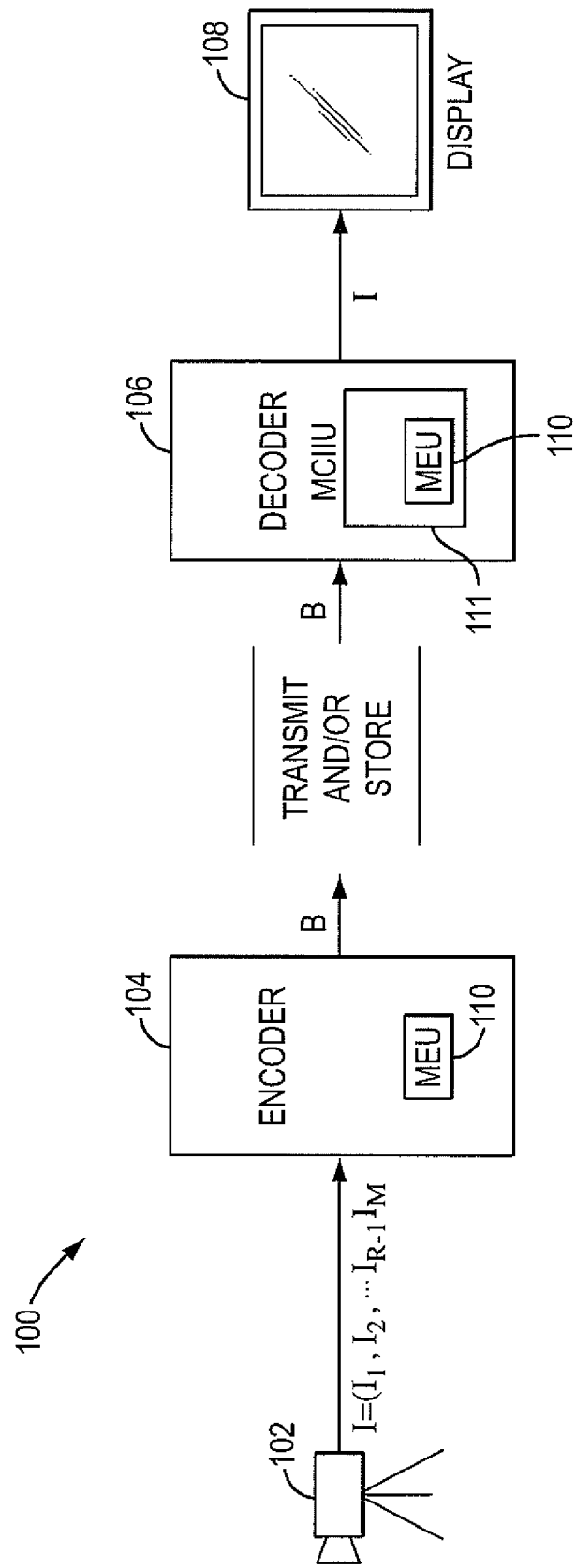
FIG. 1 illustrates a block diagram of a video coding system consistent with some embodiments of the present invention.

FIG. 1 illustrates a high-level functional block diagram of a video coding system 100 consistent with some embodiments of the present invention. It should be understood that various functional units discussed in the following description and claims can, in practice, individually or in any combinations, be implemented in hardware, in software executed on one or more hardware components (such as one or more processors, one or more application specific integrated circuits (ASIC's) or other such components) or in any combination thereof.

As shown in FIG. 1, system 100 can include an encoder unit 104 that can be coupled to receive a video signal (I) from a camera 102, and can be configured to encode signal I to obtain a bit stream B. Depending on the application, bit stream B can be stored in a memory and/or transmitted over a communication channel. As shown in FIG. 1, system 100 can further include a decoder unit 106 that can be coupled to receive bit stream B, and can be configured to reconstruct signal I from bit stream B. System 100 can also include a display 108 (such as, for example, a monitor, screen, or other such display devices) that can be coupled to decoder 106 and configured to display the reconstructed signal I. As discussed earlier, because motion estimation can play a vital role in video coding, system 100 can include a motion estimation unit (MEU) 110. In some embodiments, a motion estimation unit such as exemplary MEU 110 can be included in decoder 106. In some embodiments, MEU 110 can be included as part of a motion compensation image interpolation unit (MCIIU) 111 that can be included in a decoder such as exemplary decoder 106. MCIIU 111 can be configured to perform image interpolation that can restore (reconstruct) missing frames of a video. The details of a motion estimation unit consistent with some embodiments of the present invention is discussed in detail with respect to FIG. 7.

A natural visual scene can be spatially and temporally continuous. Typically, a visual scene can be represented in a digital form by sampling a real scene spatially (usually on a rectangular grid on an image plane) and temporally (as a series of still images (frames) sampled at regular intervals of time). As shown in FIG. 1, signal I from camera 102 can represent a visual scene as one or more still images (frames) $(I_1, I_2, \ldots, I_{n-1}, I_n)$.

Figure 2A:
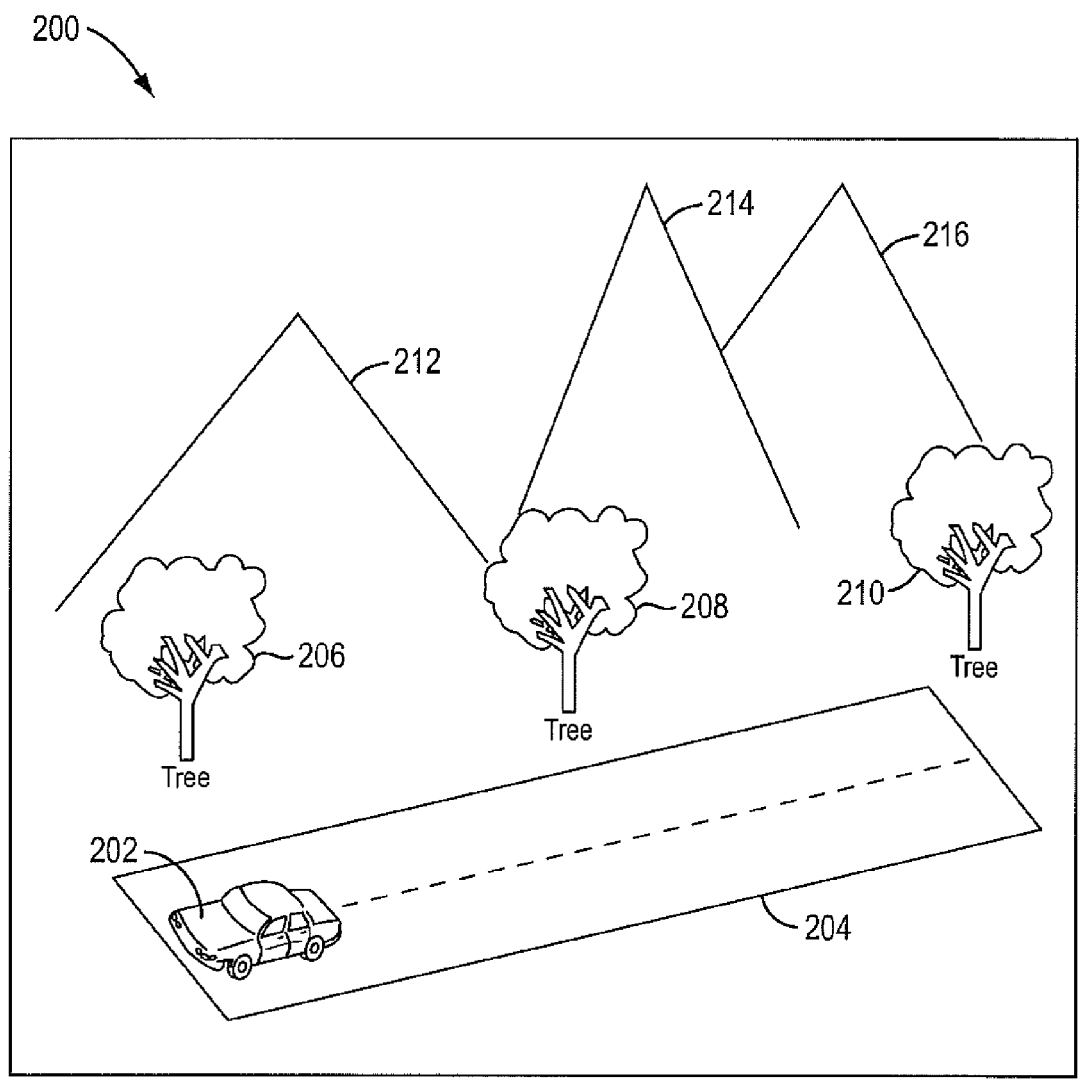
FIGS. 2a and 2b illustrate an exemplary video frame consistent with some embodiments of the present invention.
Figure 2B:
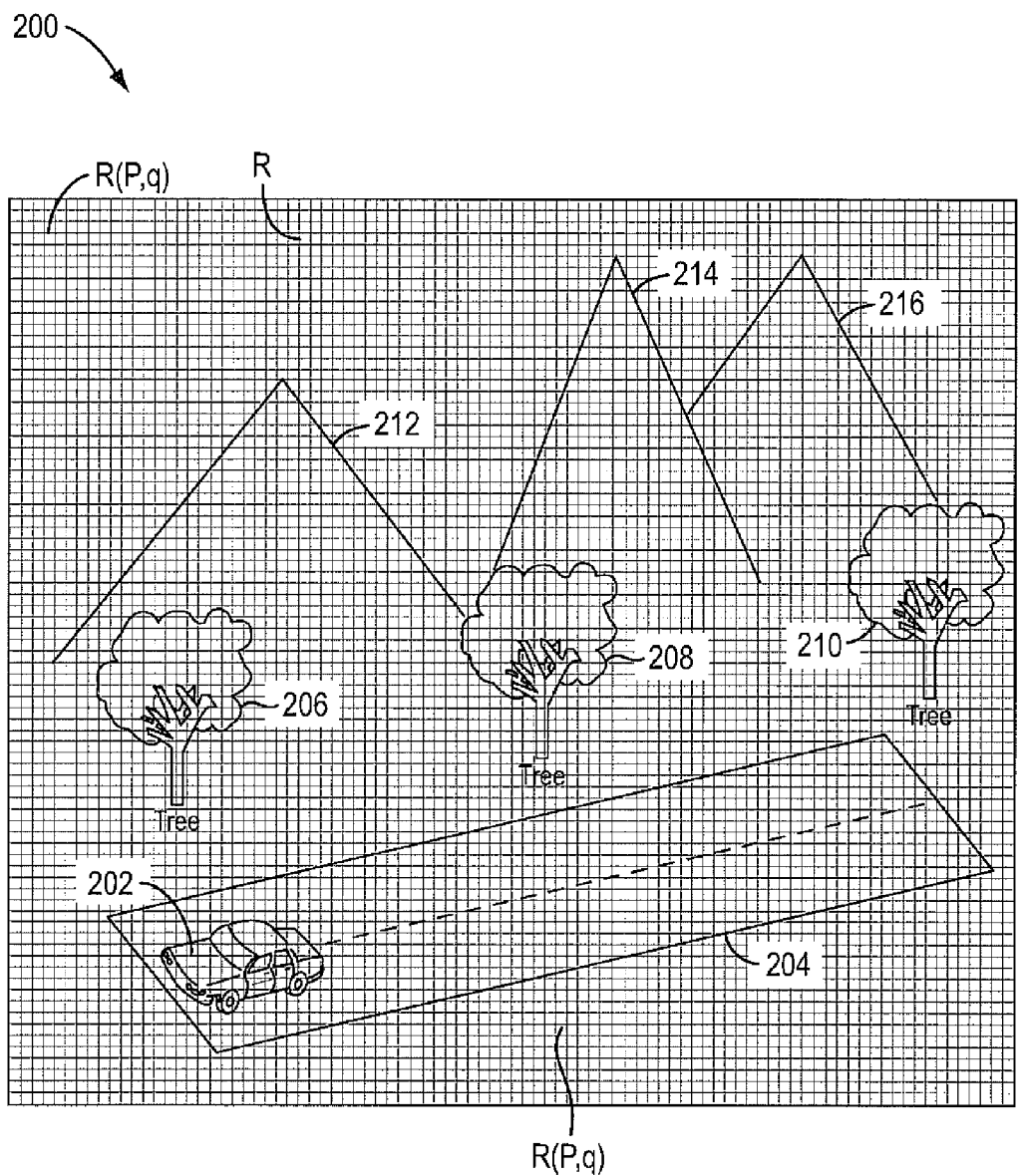

FIG. 2a illustrates an exemplary still image 200 from an exemplary natural scene that can be captured from a capture device such as camera 102. Image 200 depicts a car 202 travelling on a road 204 with hills (212, 214 and 216) and trees (206, 208 and 210) in the background. Image 200 can be represented in digital form by being sampled onto a P by Q rectangular grid R as shown in FIG. 2b. Each point R(p, q) ($0 \leq p \leq P-1$ and $0 \leq q \leq Q-1$) on rectangular grid R can correspond to a picture element (pixel). Each pixel can be represented by a number or a set of numbers that can describe brightness (luminance) and/or color. In digital applications, pixels can also be represented as one or more binary values and each frame can be represented as an array (or matrix) of corresponding pixel values. It should be understood, that based on the types of applications, the number of pixels (P×Q) in a frame may vary. Therefore, the present disclosure is not limited in the number of pixels that can be included in a frame consistent with the present invention.

Typically, a still image such as exemplary image 200 can be obtained as a 2-dimensional sampled image by a capturing device (such as a camera 102) by focusing a 2-D projection of image 200 onto a sensor (such as an array of charged coupled devices (CCD array)). A pixel array (array of pixel values) can then be derived from the output of the CCD array. In some cases, for a color image, the output of the CCD array can be filtered into one or more color components, and each color component can have a corresponding pixel array. For example, a color image in a RGB (red, green and blue) color model can include one or more pixel arrays for each color component.

As discussed earlier, a natural scene can be represented as a series of frames such as $(I_1, I_2, \ldots, I_{n-1}, I_n)$. These frames can be sampled as a series of complete frames (progressive frames) and/or as a series of interlaced frames. It should be understood that the embodiments of the present disclosure are not restricted or limited in use by the type of frames (progressive or interlaced).

Figure 3:
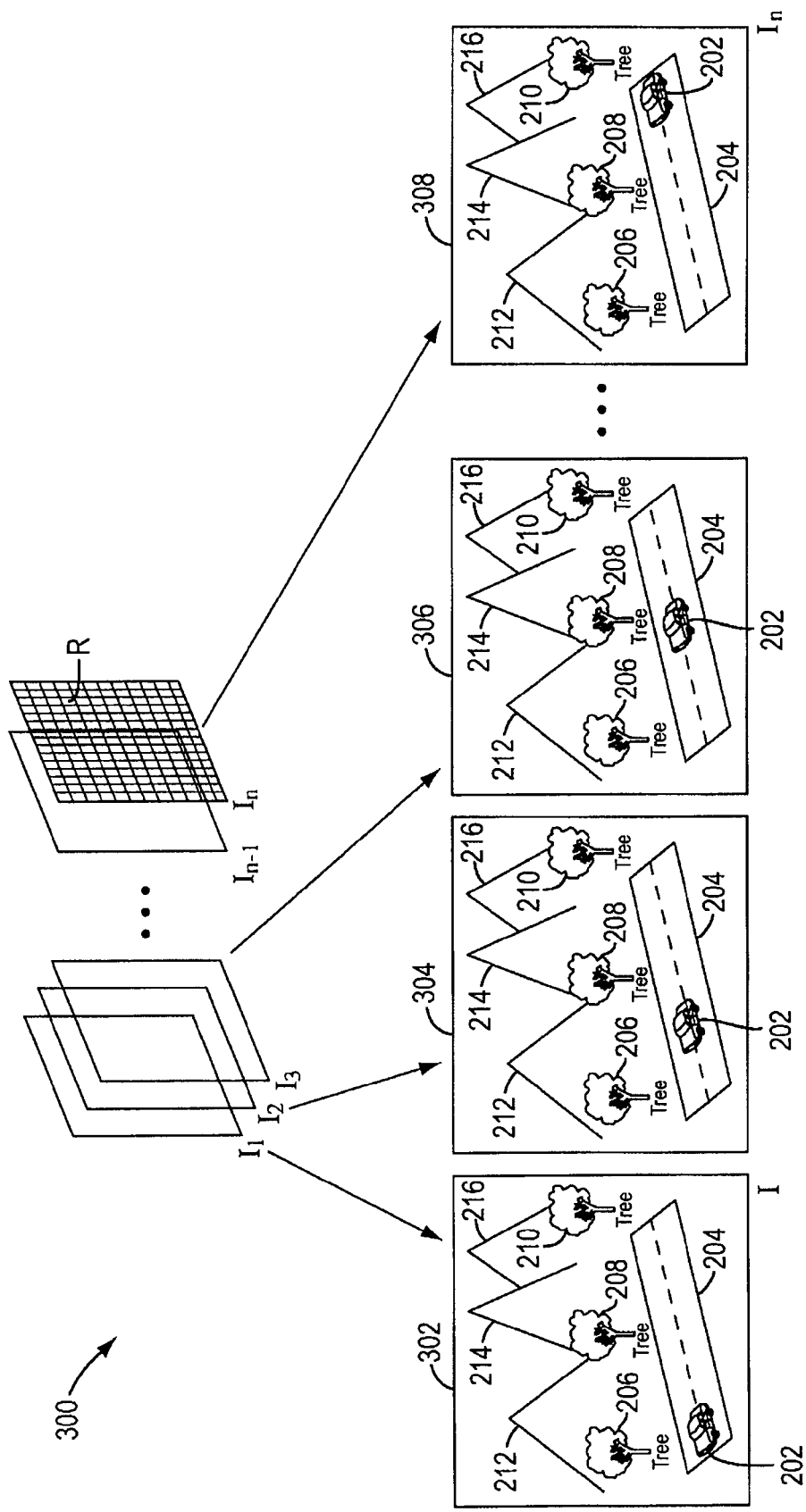
FIG. 3 illustrates an exemplary moving video consistent with some embodiments of the present invention.

FIG. 3 illustrates an exemplary moving video 300 of car 202 (illustrated in FIGS. 1a and 1b) travelling across road 204. Video 300 can be captured by a series of frames such as exemplary frames 302, 304, 306 and 308 at periodic time intervals. Playing back the series of frames can produce the appearance of car 202 in motion. For convenience, FIG. 3 illustrates video 300 as including four frames (302, 304, 306 and 308). However, it should be understood that in practice there can be any number (n) of frames that can be included in a given video such as exemplary video 300. Therefore, the present disclosure is not limited in the number of frames that can be included and supported by a system consistent with the present invention.

Each frame of video 300 can be represented in digital form in a manner similar to that discussed with respect to FIGS. 2a and 2b. Therefore, each frame in video 300 can be represented by a plurality of bits. Typically, a higher frame rate (number of frames taken per unit of time) can result in a smoother motion, and a better overall quality of video 300. However, increasing the frame rate can also increase the number of bits required to represent a video image such as exemplary video 300.

Because storage size and bandwidth availability for most video applications is limited, various coding (and/or compression) schemes can be implemented by an encoder unit (such as exemplary encoder unit 104) to achieve a balance between number of bits required to represent a given video (or bit rate) and video quality.

Typically, most video coding schemes can exploit redundant information present in scenes, both temporally and spatially, to achieve compression. In the temporal domain, there can be a high correlation (similarity) between temporally adjacent frames i.e. successive frames in time order, especially at high frame rates. In the spatial domain, there can be a high correlation between pixels that are close to one another i.e. neighboring pixels. As can be seen in FIG. 3, in frames 302, 304, 306 and 308 pixels associated with background regions such as hills (212, 214, and 216), trees (206, 208 and 210) and road 204 are constant (redundant) in all of frames (302, 304, 306 and 308). Therefore a savings in the overall number of bits required to represent video 300 can be achieved by eliminating the need for representing redundant information in each and every frame. This can be achieved by identifying common pixels in one or more frames.

However, processing frames on a pixel by pixel basis can be computationally complex. In some cases, to reduce computational complexity and further improve compression ratio, frames can be subdivided into a plurality of regions (particularly blocks), and can be processed on a block by block basis. Typically, a region (block) can include a plurality of neighboring pixels and can vary in size. Depending on the type of application, in some cases blocks can overlap with one another.

Figure 4A:
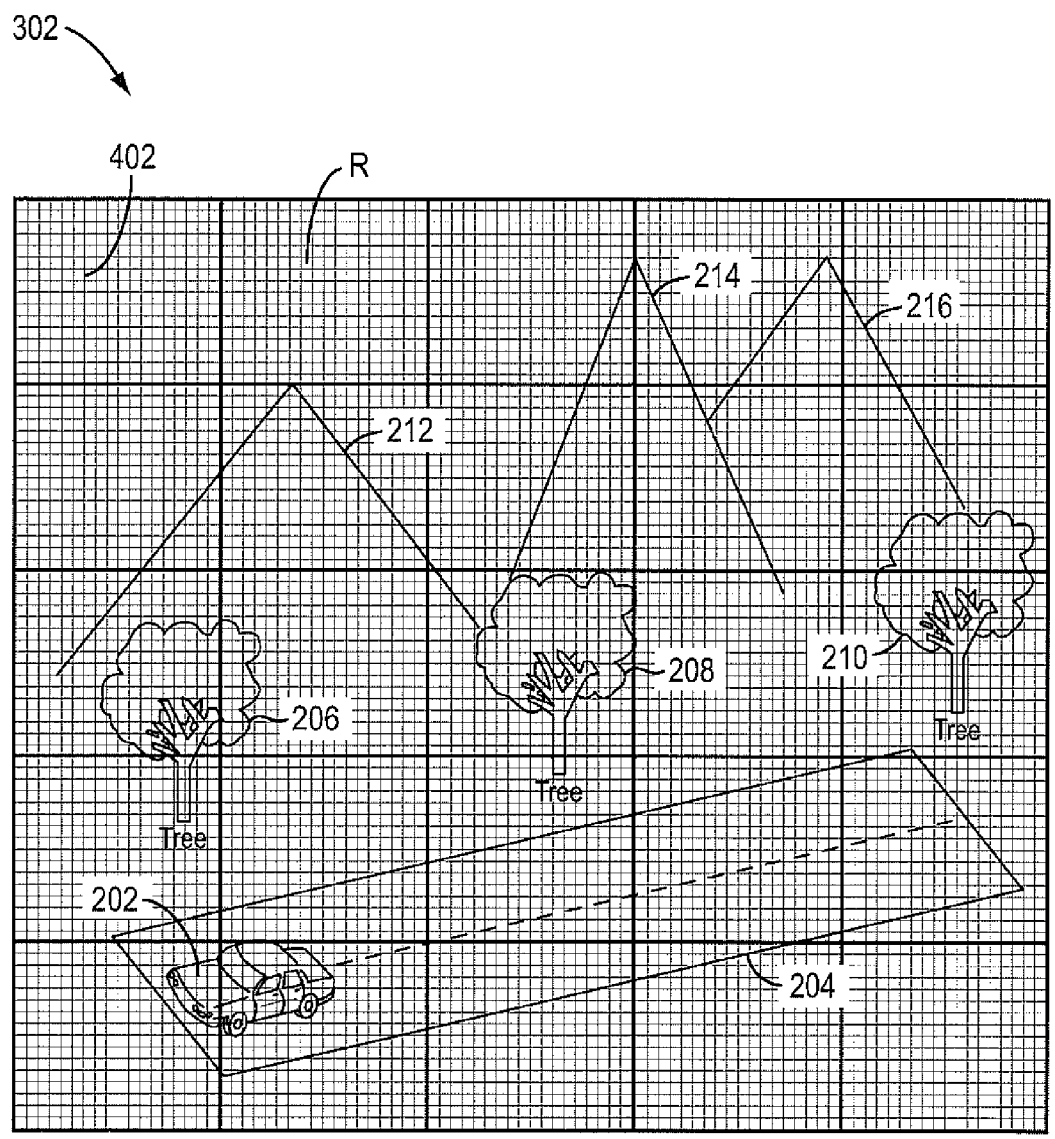
FIGS. 4a and 4b illustrate another exemplary video frame consistent with some embodiments of the present invention.

FIG. 4a depicts exemplary frame 302 divided into a 5 by 5 fixed size blocks (such as exemplary pixel block 402) each including 16 by 16 pixels. For convenience, FIG. 4a illustrates frame 302 as including 5 by 5 pixel blocks. However, it should be understood that in practice a given frame can include any number of (U by V) pixel blocks where (U<P and V<Q) and each pixel block can include any number of pixels. Therefore, the present invention is not limited in the number and/or size of the pixel blocks that can be included in a frame consistent with the present invention.

Figure 4B:
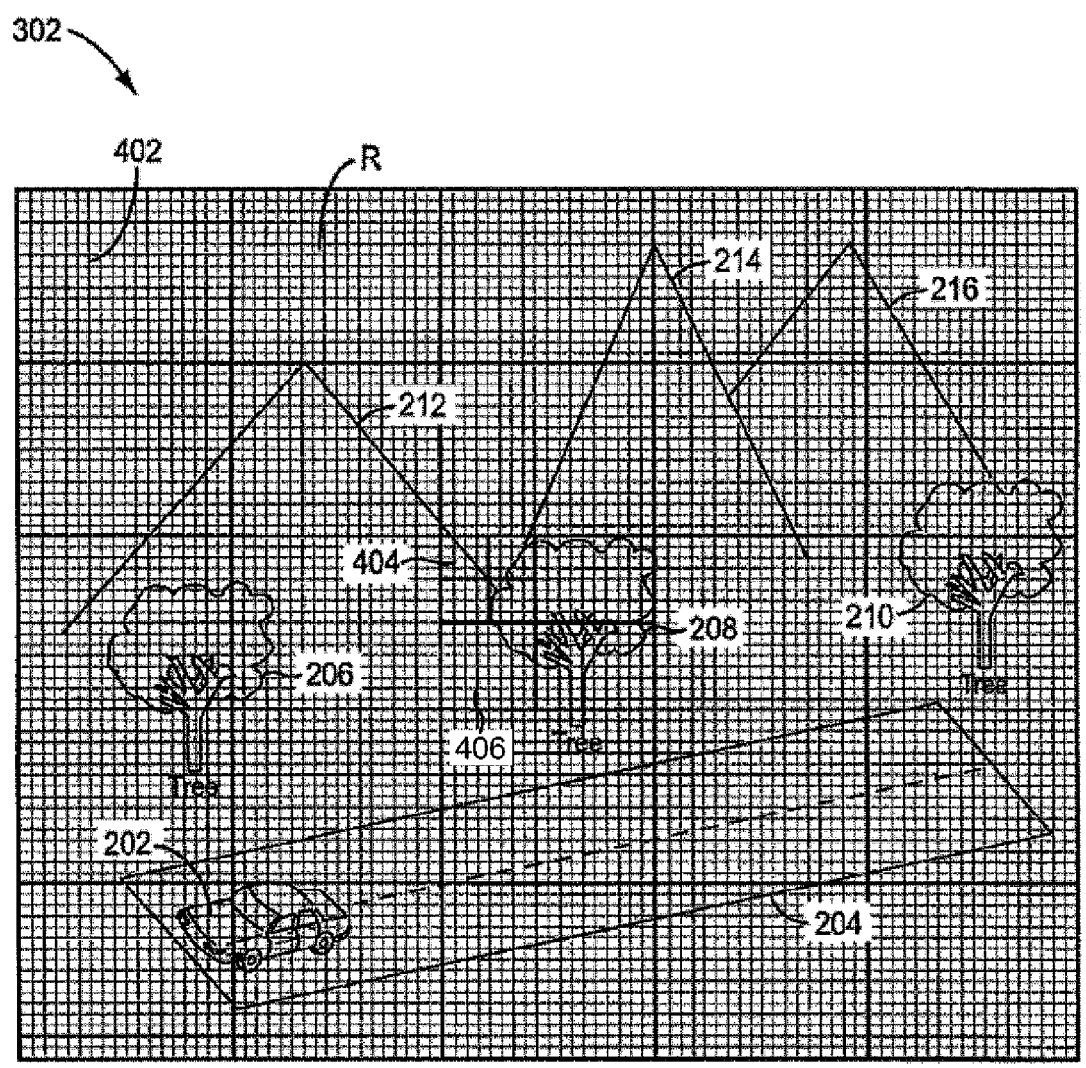

In some cases, to further improve video quality, a frame can be divided into variable block sizes. FIG. 4b depicts exemplary frame 302 divided into variable size blocks (such as exemplary pixel blocks 402, 404, and 406). For convenience, FIG. 4b illustrates frame 302 as including pixel blocks 402, 404, and 406 as being of different block sizes. However, it should be understood that in practice a given frame can include any number of (U by V) pixel blocks and each pixel block can further be divided into any number of (u by v) pixels blocks (u<U and v<V). Therefore, the present invention is not limited in the number and/or size of the pixel blocks that can be included in a frame consistent with the present invention.

Typically, changes between video frames can be caused by object motion (for example a moving car), camera motion (for example panning, tilt, zoom, rotation etc.), uncovered regions (for example, a portion of a scene background covered by a moving object) and lighting changes. With the exception of lighting changes, motion can typically involve pixel movement between frames. Therefore, by predicting the trajectory of each pixel between successive frames (motion estimation), it can be possible to accurately reconstruct a current frame by moving each pixel (according to its associated trajectory) in a reference frame (a past or future frame) (motion compensation). Because one or more frames can be represented by a single reference frame, the number of bits required to represent a video image as a whole can be reduced.

However, as mentioned earlier, processing frames on a pixel by pixel basis can be computationally expensive. Therefore, in order to reduce computational complexity, in some embodiments various motion estimation schemes can be implemented by motion estimation unit (MEU) 110 on a block by block basis.

As discussed earlier with respect to FIGS. 4a and 4b, a given frame such as exemplary frame 302 can be divided into one or more fixed and/or variable size pixel blocks. In block based motion estimation, a current block is compared to another shifted block of the same size in a reference frame. The best match between a current block and a shifted reference block yields one or more motion vectors (MV) that can describe an optimal displacement, or motion, between the two blocks. In some embodiments, motion vectors can be two-dimensional and therefore include a horizontal and vertical component. Therefore, a current frame can be represented by a reference frame by identifying blocks that have been displaced (moved) and compensating all corresponding displaced blocks in the reference frame by their respective motion vectors.

For example, in exemplary video 300, frame 304 can be represented by a reference frame, for example, such as frame 302 by identifying blocks that have moved in frame 304, calculating the corresponding motion vectors associated with the displaced blocks, and compensating the displaced blocks in frame 302 by their corresponding motion vectors. Therefore, instead of storing all the pixel values associated with frame 304, only the MV's associated with the displaced blocks in frame 304 and any difference between frame 302 and 304 (for example a region uncovered by the moving of car 202) need to be stored.

In some embodiments, MEU 110 can implement a block matching scheme to estimate motion between blocks in a reference frame and one or more current frames. In one embodiment, MEU 110 can be configured to use an error criterion (such as sum of absolute differences (SAD), sum of squared differences (SSD), sum of absolute transform differences (SATD) or other such error criteria) for all pixels included in a current block, in order to find a corresponding "best-match" block in a reference frame. Typically, because of the computational simplicity of the SAD metric or cost function, it is most commonly used.

In some embodiments, MEU 110 can perform a full-scale exhaustive search to find a globally minimum block match error (such as a minimum SAD value) for all possible motion vectors within a search area (or range). A motion vector with the minimum match error can represent a best motion estimate for the majority of pixels and the associated block can be selected as the best-match block.

Figure 5:
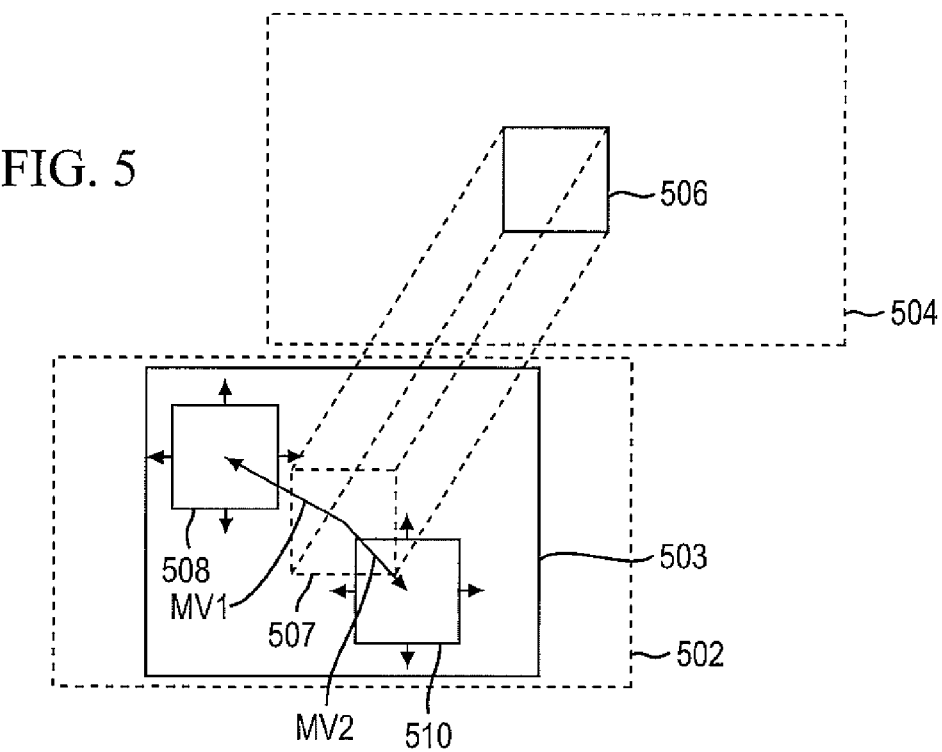
FIG. 5 is a schematic illustrating a method for motion estimation consistent with some embodiments of the present invention.

FIG. 5 is an exemplary illustration of a full scale exhaustive search block matching scheme that can be implemented by MEU 110 consistent with some embodiments of the present invention. FIG. 5 depicts a reference frame 502 and a current frame 504. Frames 502 and 504 can be similar to the frames discussed with respect to FIG. 3. Current frame 504 can include an exemplary current block 506 that can be similar to the pixel blocks discussed with respect to FIGS. 4a and 4b. As illustrated in FIG. 5, the location of image details belonging to block 506 can change from frame 502 to 504.

As shown in FIG. 5, a full search area 503 can be used in reference frame 502 to perform a block matching process to identify one or more best-match blocks (and corresponding motion vectors) associated with current block 506. The spatially aligned location of block 506 (in frame 504) is depicted in reference frame 502 by a zero displacement block 507.

The size of full search area 503 can depend on image resolution (format), frame rate and the type of application. In some embodiments, full search area 503 can have a rectangular dimension that can include (M+1×N+1) pixels with a horizontal range of [−M/2 to +M/2] and a vertical range of [−N/2 to +N/2] pixels, where M and N are even numbers and (M+1≦P and N+1≦Q). In some embodiments, the dimensions of full search area 503 can be proportional to the image format in order to ensure that velocity can be similarly represented between motion vectors in different image formats. Velocity can be defined as the amount time of required for an object in a frame to cross the frame from one border to another. For example, a search area used on a HDTV 1080p image sequence can be 225% larger than a search area used on an HDTV 720p image sequence, in order to obtain similar motion vectors. In some embodiments, in frame 502, full search area 503 can be centered around zero displacement block 507.

In some embodiments, a shifting search block (shown twice as blocks 508, and 510) in reference frame 502, having the same dimensions as current block 506, can be displaced by unit pixel increments in order to compute block match errors that can be associated with all possible displacements (of block 506) in full search area 503. The displacement that corresponds to a global minimum block match error can be identified as a best-match block. For example, in FIG. 5, block 508 can be depicted as the "best-match" candidate, while block 510 can be depicted as an alternate "best match" candidate, for block 506 in reference frame 502. As shown in FIG. 5, blocks 508 and 510 can be assigned motion vectors MV1 and MV2 respectively. For convenience, FIG. 5 illustrates full search area 503 as including only two blocks (508 and 510) and corresponding motion vectors (MV1 and MV2) as best-match candidates for current block 506. However, it should be understood that in practice there may be any number of best-match candidates (MV's and/or blocks) that can be included in a full search area. Therefore, the present invention is not limited in the number of MV's that can be included in a search area consistent with the present invention.

As discussed in FIG. 5, MEU 110 can identify best-matching blocks 508 and 510 in reference frame 502 by performing a full-scale exhaustive search. However, full scale exhaustive search schemes can be computationally expensive as the number of blocks within a given frame increase. In addition, full-scale exhaustive search schemes can result in multiple best-match blocks as depicted in FIG. 5. An erroneous mismatch of a best-match block at the time of motion compensation and/or image interpolation can result in noticeable artifacts. There can be many types of image features for which an erroneous mismatch may occur. For instance, in the case of a straight line feature, motion vectors, of any length, parallel to that feature can result from a full-scale search. And, any of the resulting motion vectors associated with the straight line feature can be randomly selected and can cause errors when interpolating other pixels near the feature.

For example, in FIG. 5, let us assume that MV2 (associated with block 510) in frame 502 is a true motion vector associated with current block 506. Because matching blocks 508 and 510 can all have similar low match error values, it can be possible for MEU 110 to erroneously select block 508 as the best-match for block 506. Such an erroneous mismatch of blocks can result in a degraded video quality.

Because motion vectors can be used for image interpolation, accurate representation of the true motion of objects and details in an image sequence can ensure that image objects and details are displaced at their proper interpolated spatial position, and can thus avoid the presence of artifacts in interpolated images.

Because an image can include various repetitive structures, also known as lattice structures or periodic structures, identification of these lattice structures can help in improving the representation of true motion. In some embodiments, MEU 110 can implement a lattice structure detection scheme that can generate one or more lattice structure maps (or lattice structure period maps) that can identify various lattice structures in an image. A lattice structure period map can include horizontal pitch period values that classify horizontal motion vector components, and vertical pitch period values to classify vertical motion vector components. A pitch period can be defined as a smallest repeating unit of a lattice structure.

A lattice structure detection scheme that can be implemented by MEU 110 will be discussed in detail with respect to FIGS. 9a and 9b.

Lattice structures can be notably present in objects such as buildings, windows, grills, fences and text etc. In an exhaustive full search method (as discussed in FIG. 5), MEU 110 can identify a plurality of best-match motion vectors (as depicted in FIG. 5), having similar low block match errors, within a full search area (such as search area 503). For example, if a lattice structure has a horizontal pitch period (smallest repeating unit of a lattice structure) of 10 pixels and a true horizontal motion of +3 pixels, it can be possible for MEU 110 to find horizontal motions of −7 pixels (3−10) or +13 pixels (3+10), as possible best-match candidates. Although there can be one local minimum match error that can correspond with a true motion vector, in some cases, because of effects such as changes in lighting of a scene, camera pan, or other such intrinsic optical effects, it can be possible for a global minimum match error to be associated with one or more of the identified best-match candidates. By reducing the size of a search area (such as full search area 503), the number of local minima can also be reduced; making the global minimum more likely to be associated with a true motion vector. However, if full search area 503 is small, only a limited range of object displacements can be properly estimated which can compromise overall motion estimation. Therefore, in order to inhibit erroneous block mismatch without compromising motion estimation, in some embodiments, MEU 110 can implement an adaptive search scheme to find best-match blocks (and motion vectors).

Figure 6:
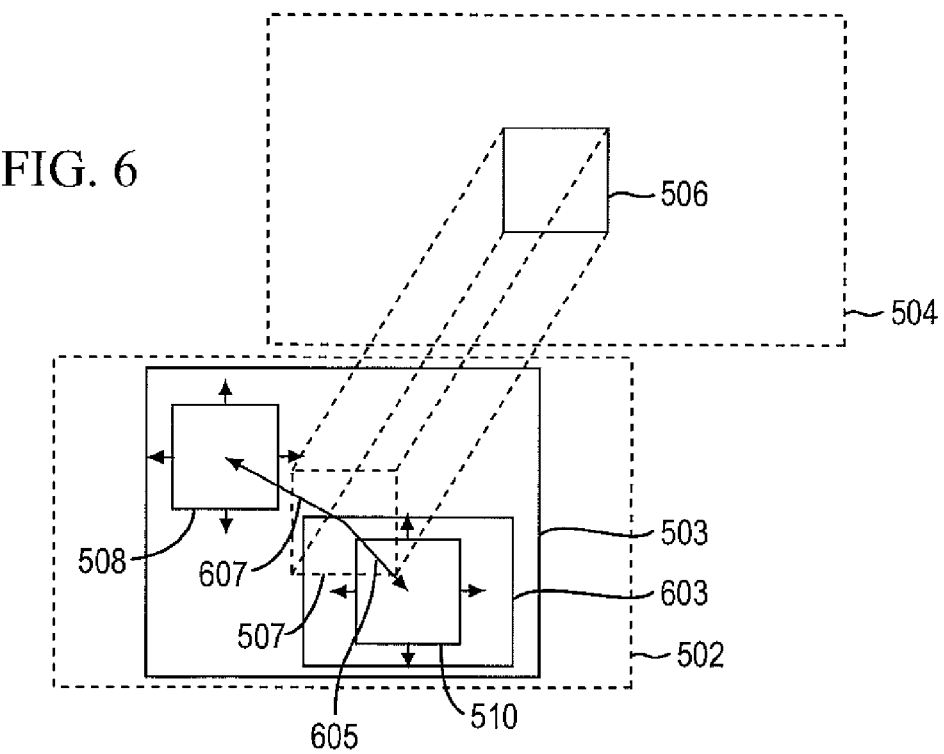
FIG. 6 is a schematic illustrating another method for motion estimation consistent with some embodiments of the present invention.

FIG. 6 is a schematic illustrating an adaptive search scheme that can be implemented by MEU 110 consistent with some embodiments of the present invention. FIG. 6 depicts reference frame 502 and current frame 504. In a manner similar to that discussed with respect to FIG. 5, the location of block 506 can change from frame 502 to 504.

As shown in FIG. 6, in addition to full search area 503, an adaptive search area 603 can be used in reference frame 502 to perform a block matching process to identify one or more best-match blocks (and estimate motion vectors) associated with current block 506. In some embodiments, full search area 503 and adaptive search area 603 can be centered around zero displacement block 507.

In some embodiments, as full search block matching can take place in full search area 503, and a subset of block match errors can be gathered for all displacements that can be included (fall within) adaptive search area 603. The block matching errors (computed in areas 503 and 603) can be compared in order to find a local minimum error corresponding to the position of the best matching block. For example, FIG. 6 depicts block 510 (included in adaptive search area 603) as the best-match block with a motion vector 605 as the corresponding motion vector. As discussed earlier, it can be possible for full search area 503 and adaptive search area 603 to include a plurality of best-match blocks and corresponding motion vectors. For convenience, the following description can collectively refer to all the best-match MV's and corresponding block match errors that can be included in full search area 503, as best-match vector 607, and block match error 609, respectively. Similarly, the following description can collectively refer to all the best-match MV's and corresponding block match errors that can be included in adaptive search area 603, as best-match vector 605 and block match error 611, respectively.

In some embodiments, the dimension of full search area 503 can be fixed and rectangular (similar to that discussed in FIG. 5), while adaptive search area 603 can have variable dimensions and can be offset (from the center of zero displacement block 507) by an anticipated motion value.

In some embodiments, adaptive search area 603 can have a rectangular dimension that can include (m+1×n+1) pixels with a horizontal range of [−m/2 to +m/2] and a vertical range of [−n/2 to +n/2] pixels, where m and n are even numbers and (m<M and n<N). In some embodiments, adaptive search area 603 can include a motion offset value offset of $(O_h, O_v)$ pixels where $O_h$ and $O_v$ are the corresponding horizontal axis and vertical axis offsets of the center of adaptive search area 603 from the center of full search area 503. In some embodiments, m, n, $O_v$ and $O_h$ can be obtained from a lattice structure map and a motion vector histogram (MVH).

A MVH can be a 2-dimensional histogram array that can represent all possible horizontal motion values ($MV_h$) [from −N/2 to N/2] on its horizontal axis and all possible horizontal pitch period values ($T_h$) [from 2 to N] on its vertical axis. In some embodiments, a MVH can be similar to a small image in the sense that each histogram bin can be analogous to an image pixel. In some embodiments, two histograms can be generated for each frame, one for horizontal motion vector components and horizontal periods, and another for vertical motion vector components and vertical periods. A MVH that can be used by MEU 110 is described in detail with respect to FIG. 10.

Typically in a lattice structure, the distance between two good candidate vector components can be a multiple of a pitch period value. Equation (1) shows the relation between a true Motion Vector (MVT) and any selected Motion Vector (MVS) over a lattice structure having a pitch period value (T).

$$MVT_h = MVS_h + k*T_h \quad (1)$$

Where $(._h)$ denotes the horizontal components of the motion vectors and pitch period, and k is a signed integer variable that can indicate the number of periods the selected motion vector is offset from the true motion vector. In an ideal situation, k=0.

As can be derived from Equation (1), the number of local minima in adaptive search area 603 can be limited to one, when m is less than a vertical pitch period value $(T_v)$ and n is less than a horizontal pitch period value $(T_h)$. In some embodiments, dimensions (such as m, n, $O_h$ and $O_v$) of adaptive search are 603 can be set according to equations (2) and (3).

$$m=T_v-1 \qquad (2)$$

$$n=T_h-1 \qquad (3)$$

As can be seen in equations (2) and (3), Both $T_h$ and $T_v$ can be assumed to be greater than or equal to 2. If $T_v=0$, then no vertical lattice structure is detected, and m can be set to a constant value relative to M and offset $O_v=0$. If $T_h=0$, then no horizontal lattice structure is detected, and n can be set to a constant value relative to N and offset $O_h=0$.

In some embodiments, adaptive search area 603 may be clipped when high/fast motion (displacement) is present. In some embodiments, in order to ensure that no extra computation for block match error calculations are required, adaptive search area 603 can be an inclusive subset of full search area 503 and block matching in all exclusive areas can be disregarded. For example, offset($O_h$=N/2), the position of the center of adaptive search area 603 would be at the right boundary of full search area 503, resulting in only the left half of the adaptive search area 603 to be considered.

In some embodiments, the size of search areas 503 and 603 can depend on the image resolution. For example the size of areas 503 and 603 for high definition HD-1080 can be larger than the size for HD-720 and still larger than the size for HD-480. In some embodiments, search areas 503 and 603 for SD-720 can be two times the size for SD-480 and for HD-1080 can be three times the size of SD-480.

For convenience, FIG. 6 illustrates frame 502 as including two search areas (full search area 503 and adaptive search area 603). However, it should be understood that in practice a given frame can include any number of search areas. Therefore, the present invention is not limited in the number of search areas that can be included in a frame consistent with the present invention.

For convenience, FIG. 6 illustrates full search area 503 and adaptive search area 603 as each identifying one best-match block. However, it should be understood that in practice a search area can identify any or no number of best-match blocks. Therefore, the present invention is not limited in the number of best-match blocks that can be included in a search area consistent with the present invention.

As discussed earlier, a "best-match" block can be selected as a block that minimizes certain block match error such as SAD, SSD, SATD or other such match errors. In some embodiments, MEU 110 can be configured to select a best-match block that can satisfy (fall between) one or more error ranges. In some embodiments, the error ranges for selecting a best-match block can be externally programmed and/or communicated to MEU 110.

Figure 7:
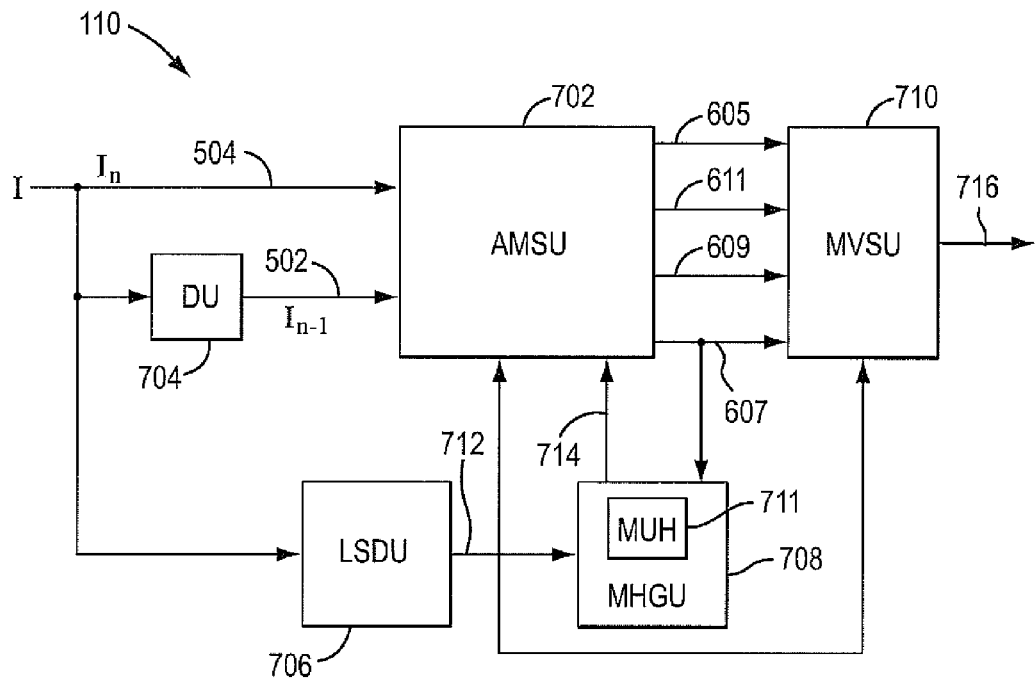
FIG. 7 illustrates a high-level block diagram of an apparatus for motion estimation consistent with some embodiments of the present invention.

FIG. 7 illustrates a block diagram of motion estimation unit (MEU) 110 that can be included in a video coding system such as system 100 consistent with some embodiments of the present invention. As can be seen in FIG. 6, in some embodiments, MEU 110 can include a delay unit (DU) 704 that can be coupled to receive a video signal (such as signal I) and extract one or more frames (such as reference frame 502) that can be spatially aligned with a current frame (such as current frame 504). MEU 110 can include an adaptive motion estimation search unit (AMSU) 702 that can be coupled to receive current frame 504 and reference frame 502 (from DU 704). AMSU 702 can be further configured to implement an adaptive search scheme to identify full search motion vectors and block match errors (607, and 609, respectively) and adaptive search motion vectors and block match errors (605 and 611, respectively).

MEU 110 can further include a lattice structure detection unit (LSDU) 706 that can be coupled to receive signal (I) and can be configured to generate a block based lattice structure map (or lattice period map) 712 for one or more frames that can be included in signal I. As shown in FIG. 7, AMSU 702 can receive lattice structure map 712 from LSDU 706.

MEU 110 can further include a motion histogram generator unit (MHGU) 708 coupled to receive lattice structure map 712 (from LSDU 706) and full search motion vectors 607 (from AMSU 702). MHGU 708 can be configured to generate motion offset parameters 714 (such as offset values $O_h$ and $O_v$).

As is shown in FIG. 7, MEU 110 can further include a motion vector selection unit (MVSU) 710 that can be coupled to receive motion vectors (607 and 605), block-match errors (609 and 611) and lattice structure map 712. MVSU 710 can be configured to select a final motion vector 716 that can represent a best-match block.

Upon initialization or a scene change, current frame 504 and reference frame 502 can be received by AMSU 702, and AMSU 702 can perform a full exhaustive search to identify full search motion vectors 607 and corresponding block match errors 609. Simultaneously, MHGU 708 can receive lattice structure map 712 from LSDU 706 and can accordingly create a two-dimensional MVH 711 that can represent motion vectors 607. A MVH 711 that can be generated by MHGU 708 will be discussed in detail with respect to FIG. 10.

In some embodiments, by the time the last block of current frame 504 is processed by AMSU 702, MVH 711 in MHGU 708 will have gathered motion information (classified by lattice structure map 712) for entire current frame 504. MHGU can further process MVH 711 to compute motion offset parameters 714 for each available period value in lattice structure map 712. AMSU 702 can further receive motion offset parameters 714 and lattice structure map 712, and can accordingly configure dimensions (such as m, n, $O_h$, $O_v$) of adaptive search area 603.

As a block undergoes motion estimation in AMSU 702, full search area 503 can compute block match errors 609 and corresponding motion vectors 607 for all motion displacements that can be included in full search area 603, and adaptive search area 603 can compute block match errors 611 and corresponding motion vectors 605 for all motion displacements that can be included in adaptive search area 603. Motion vectors (607 and 605) and block match errors (609 and 611) can be further sent to a motion vector selection unit (MVSU) 710 that can compare block match errors (609 and 611) according to lattice structure map 712 and can select between a final motion vector 716. A MVSU 710 consistent with some embodiments of the present invention is discussed in detail with respect to FIG. 11.

Figure 8:
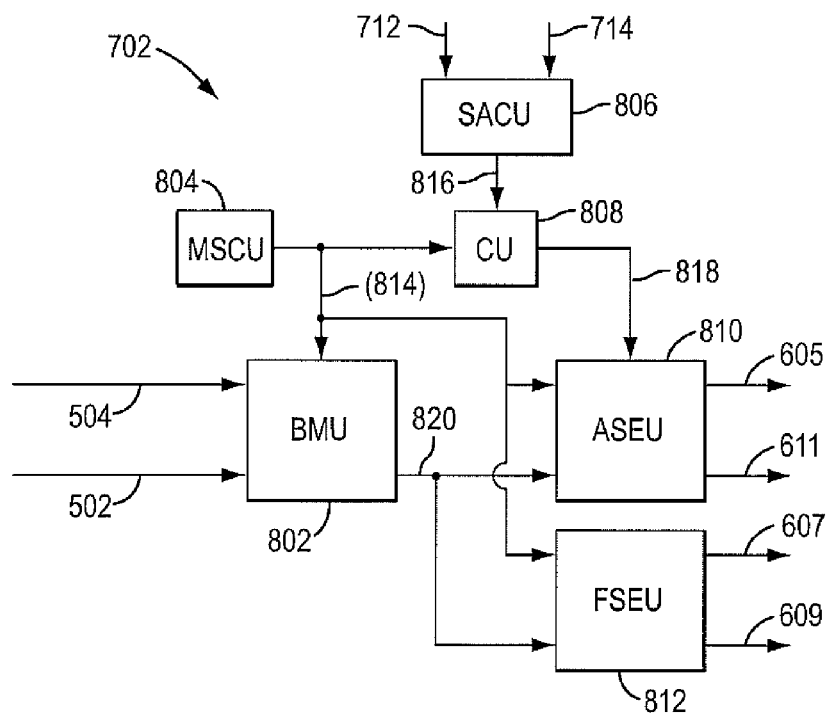
FIG. 8 illustrates a block diagram of another apparatus for motion estimation consistent with some embodiments of the present invention.

In some embodiments, backwards as well as forward motion vectors can be obtained for frames (502 and 504) by swapping the two frames. FIG. 8 illustrates a block diagram of AMSU 702 that is consistent with some embodiments of the present invention. As can be seen in FIG. 8, AMSU 702 can include a block matching unit (BMU) 802 that can be coupled to receive current frame 504 and reference frame 502. BMU 802 can be configured to generate block match errors 820 by evaluating one or more block match error criteria (such as SAD) for all possible displacements (dx,dy) 814 in full search area 503. AMSU 702 can further include a motion vector scanner unit (MSCU) 804 that can generate displacements 814. In some embodiments, MSCU 804 can generate displacements 814 in a raster scan manner, starting from location (−M/2, −N/2) and finishing at (M/2, N/2).

As shown in FIG. 8, AMSU 702 can further include full search evaluation unit (FSEU) 812 and a adaptive search evaluation unit (ASEU) 810 that can be coupled to receive displacements 814 and block match errors 820. In some embodiments, block match errors 820 can be sequentially sent to FSEU 812 and ASEU 810 along with their corresponding displacements. FSEU 812 can be configured to evaluate a global minimum block match error for full search area 503 and can generate best-match motion vector 607 along with corresponding block match error 609.

AMSU 702 can further include a search area computation unit (SACU) 806 that can be coupled to receive lattice structure map 712 and motion parameters 714, and can be configured to compute dimensions 816 (such as m, n) of adaptive search area 603. As shown in FIG. 8, AMSU 702 can further include a comparator unit (CU) 808 that can be coupled to receive displacements 814 and dimensions 816, and can be configured to compare each (dx,dy) displacement in 814 during the full search block matching of current frame 504 to identify if the displacement (dx, dy) is included in adaptive search area 603. In some embodiments, CU 808 can indicate if a (dx,dy) displacement is included in adaptive search 603 area by a binary signal 818.

As shown in FIG. 8, ASEU 810 can further receive signal 818 and can compute a local minimum block match error 611 for all (dx,dy) displacement values that can be included in adaptive search area 603 along with the corresponding best-match vector 605.

Figure 9A:
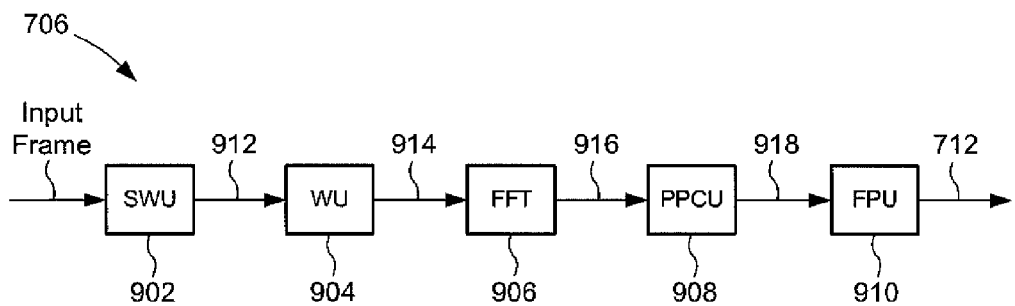
FIG. 9a illustrates a block diagram of yet another apparatus for motion estimation consistent with some embodiments of the present invention.

FIG. 9a illustrates a block diagram from LSDU 706 consistent with some embodiments of the present invention. As shown in FIG. 9a, LSDU 706 can include a sampling window unit (SWU) 902 that can be coupled to receive a frame such as frame 502 and can be configured to implement a window based sampling on pixels in frame 502 to obtain pixel samples 912. In some embodiments, SWU 902 can include a normalized one-dimensional sampling window and the size of the sampling window can depends on the pitch period range that can be detected. In some embodiments, for a period range of [2 to N], a sampling window size of at least 2N pixels can be used. In some embodiments, SWU 902 can normalize pixel samples 912 (of frame 502) to a zero value average by computing an average value of all sampled pixels and subtracting the average value from each pixel sample.

As is shown in FIG. 9a, LSDU 706 can further include a weighting unit (WU) 904 that can be coupled to receive pixel samples 912, and can be configured to implement a weighting function in order to obtain weighted pixel samples 914. A weighting function that can be implemented by WU 904 can put more emphasis on pixel samples around the center of the sampling window and less emphasis on the samples near the ends of the sampling window. In some embodiments, WU 904 can implement a Hamming window modulation (or weighting) on pixel samples 912 to obtain weighted samples 914. In some embodiments, the use of a hamming window can provide more consistent period detections from one neighboring block to the next.

LSDU 706 can further include a Fast Fourier Transform unit (FFT) 906 than can be coupled to receive weighted samples 914 and can be configured to perform a Fourier transform to obtain transform coefficients 916. In some embodiments, coefficients 916 can include only the magnitude components of the coefficients.

As shown in FIG. 9a, LSDU 706 can also include a peak and period computation unit (PPCU) 908 that can be coupled to receive coefficients 916 and can be configured to implement a peak detection scheme, on the magnitude spectrum of coefficients 916 to detect the strongest frequency amplitude peaks. PPCU 908 can further select the best peak frequency value, and can converted the best peak frequency values into a pitch period map 918. LSDU 706 can further include a filter period unit (FPU) 910 that can be coupled to receive pitch period map 918, and can be configured to generate lattice structure map (or lattice structure period map) 712 by filtering period map 918. By filtering period map 918, FPU 910 can further improve the consistency (smoothness) and eliminate isolated or false detections of the detected periods in period map 918.

Figure 9B:
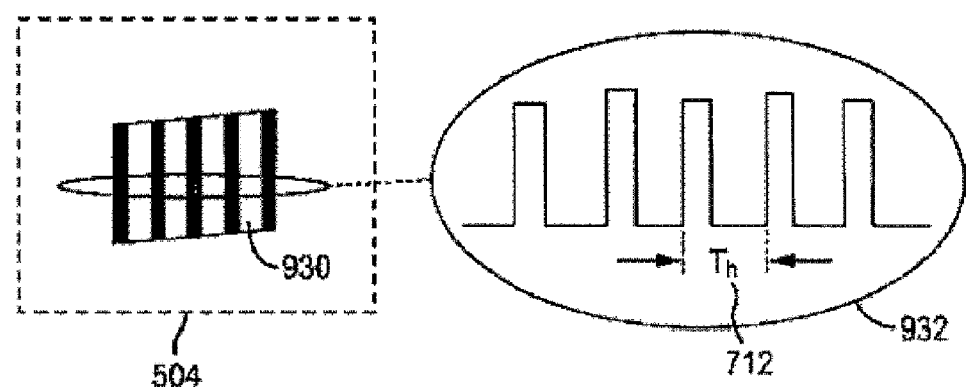
FIG. 9b is a schematic of a lattice structure consistent with some embodiments of the present invention.

FIG. 9b illustrates an exemplary lattice structure 930 that can be included in frame 502. Circled area 932 illustrates the horizontal component of frame 502 indicating a horizontal pitch period value ($T_h$). Information regarding pitch period such as horizontal pitch period $T_h$ can be included in lattice structure map 712.

In some embodiments, other methods such as windowed signal autocorrelation can be used instead of windowed frequency transforms to detect the period values of lattice structures on a block by block basis. In some embodiments, lattice structures can also be detected hierarchically on different resolutions of an input frame. The use of a hierarchical detection scheme can allow the detection of a wider range of pitch periods through various image down-sampling stages. For example, if an image is downscaled by 2, periods can appear to be twice as small so the equivalent period detection range becomes twice as large.

Figure 10:
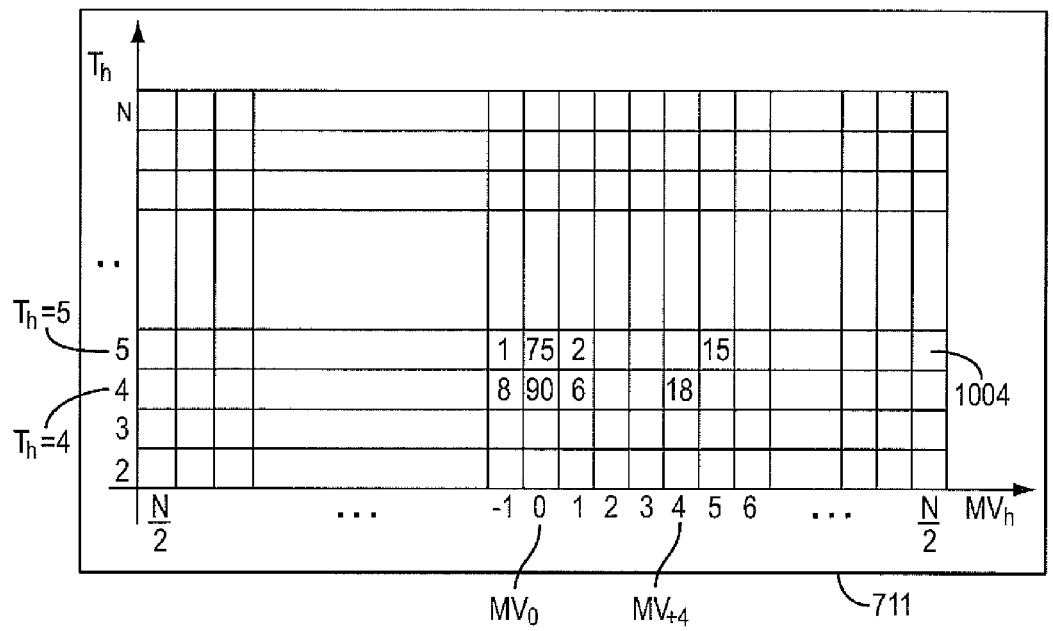
FIG. 10 is a schematic of a motion vector histogram consistent with some embodiments of the present invention.

As discussed earlier with respect to FIG. 7, MHGU 708 can generate a motion vector histogram (MVH) 711 that can be used to compute motion offset parameters 714 that can be used by AMSU 702. FIG. 10 illustrates an exemplary histogram MVH 711 that can be generated by MHGU 708.

As can be seen in FIG. 10, MVH 711 can include histogram bins such as exemplary histogram bin 1004. A horizontal axis ($MV_h$) can represent all possible horizontal motion values, from [−N/2 to N/2] and vertical axis ($T_h$) can represent all possible detected horizontal pitch period values [from 2 to N]. The example of histogram MVH in FIG. 10 indicates a frame having a lattice structure that includes a detected pitch period of 4 in some pixel blocks and 5 in other pixel blocks. Furthermore, as is shown in FIG. 10, for both period values of 4 and 5, the most occurring motion vector is $MV_0$ (occurring 75 and 90 times, respectively). As depicted in FIG. 10, for a pitch period of 4, $MV_0$ and $MV_{+4}$ are exactly one pitch period value apart from each other, indicating a possibility that the $MV_{+4}$ can be erroneously mismatched in particular blocks of a frame.

As discuss earlier, MHGU 708 can analyze MVH 711 to generate motion offset values 714. In some embodiments, MHGU 708 can filter MVH 711 to determine an optimal motion for each period in lattice structure map 712. For example, referring to MVH 711 depicted in FIG. 10, blocks belonging to a periodic lattice structure of period 4 or 5 can have adaptive search area 603 configured such that horizontal offset $O_h$ can be set to 0 and width n can be set to a value as discussed with respect to Equation (3).

In some embodiments, all histogram bins (such as exemplary bin 1004) can reset with the entry of every new frame. As discussed earlier, in some embodiments, MHGU 708 can generate two histograms for each frame, one for horizontal motion vector components and horizontal periods, and another for vertical motion vector components and vertical periods.

Figure 11:
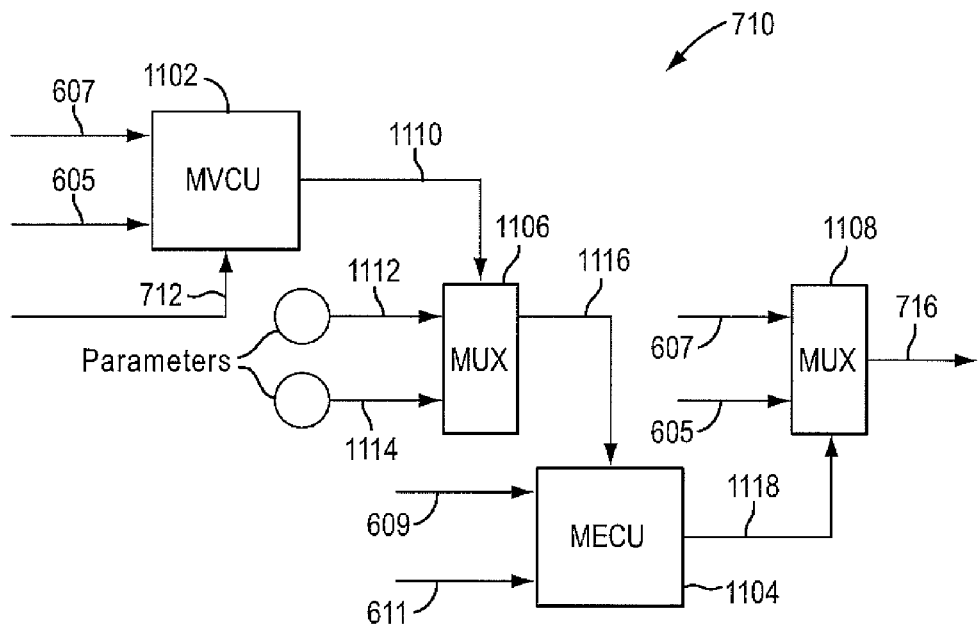
FIG. 11 illustrates a block diagram of an apparatus for motion estimation consistent with some embodiments of the present invention.

FIG. 11 illustrates a block diagram of motion vector selection unit (MVSU) 710 consistent with some embodiments of the present invention. As is shown in FIG. 11, MVSU 710 can include a motion vector comparison unit (MVCU) 1102 that can be coupled to receive full search and adaptive search motion vectors (607 and 605) and lattice structure map 712. MVCU 1102 can be further configured to compare the absolute difference between motion vectors (607 and 605) for each block. If the absolute difference between vectors (607 and 605) for a given block is non-zero and a multiple of the pitch period value (from lattice map 712), in some embodiments, MVCU 1102 can generate a validation signal 1110 that can indicate a presence of a lattice structure in the input frame at the current block location. In some embodiments, validation signal 1110 can be binary signal.

MVSU 710 can further include a multiplexer 1106 that can be coupled to receive validation signal 1110 and can be configured to select between parameters (1112 and 1114). Based on validation signal 1110, multiplexer 1106 can send penalty parameters 1116, that can include a factor and an offset value. As is shown in FIG. 11, MVSU 710 can include a match error computation unit (MECU) 1104 that can be coupled to receive match errors (609 and 611) and penalty parameters 1116. MECU 1104 can be further configured to generate a selection signal 1118. In some embodiments, penalty parameters 1116 can be used by MECU 1104 to penalize the corresponding full search match error 609 and make the corresponding adaptive search motion vector 605 more favorable for selection. For example, if a lattice structure is present, multiplexer 1106 can be configured via validation signal 1110 to send penalty parameter 1116 that can allow MECU 1104 to make adaptive search motion vector 605 more likely to be selected (via selection signal 1118 and multiplexer 1108) because of a larger penalty applied on full search match error 609. In the absence of a periodic lattice structure, multiplexer 1106 can be configured by validation signal 1110 to generate penalty factor 1116 such that MECU 1104 can apply a smaller penalty to full search match error 609 such that adaptive search vector 605 can be selected (via selection signal 1118 and multiplexer 1108) when the block match errors (609 and 611) are similar. In some embodiments, because of its global minimum, the non-penalized full search match error 609 can be less than or equal to the adaptive search match error 611.

In some embodiments, selection signal 1118 can be a binary signal. Based on selection signal 1118, multiplexer 1108 can select a final motion vector 716 between full search and adaptive search motion vectors (607 and 605).

Other embodiments will be apparent to those skilled in the art from consideration of the specification and practice disclosed herein. It is intended that the specification and examples be considered as exemplary only, with a true scope and spirit of the invention being indicated by the following claims.

What is claimed is:

1. A method estimating motion of a pixel block in a first frame of a series of video frames, the method comprising:

storing the first frame and a second frame in computer memory;

searching a first area in the second frame to identify a first matching block that corresponds to the pixel block, the first matching block including a first error value that is a minimum of at least one error criteria between the pixel block and the first matching block, calculating a first motion vector associated with the first matching block;

searching a second area in the second frame, the second area being smaller than the first area and contained within the first area, to identify a second matching block that corresponds to the pixel block, the second matching block including a second error value that is a minimum, with respect to the second area, of the at least one error criteria between the pixel block and the second matching block, calculating a second motion vector associated with the second matching block; and selecting a final motion vector between the first and second motion vectors based on the first and second error value.

2. The method of claim 1 wherein searching the first area to identify the first matching block, further comprises:

providing the first area as an area spanned by a first plurality of pixel blocks; and searching through each of the first plurality of pixel blocks to identify the first matching block including the first error value that is a minimum of the at least one error criteria between the pixel block and the first matching block; and calculating a first motion vector associated with the first matching block.

3. The method of claim 1 wherein searching the second area to identify the second matching block, further comprises:

creating a first lattice structure map of the first frame, the lattice structure map including at least one pitch period value associated with at least one repeating structure in the first frame;

generating a first histogram for the first frame, the first histogram being derived from a set of motion vectors produced while searching the first area of the second frame and the first lattice structure map, the first histogram including a relation between the first and second motion vector and the at least one pitch period value;

deriving at least one parameter from the first lattice structure map and the first histogram;

providing the second area as an area spanned by a second plurality of pixel blocks the second area further including at least one dimension derived from the at least one parameter; and searching through each of the second plurality of pixel blocks to identify the second matching block;

calculating the second motion vector associated with the second matching block.

4. The method of claim 1 wherein selecting the final motion vector between the first and second motion vectors further comprises:

sending a first penalty parameter based on the at least one pitch period value included in first lattice structure map, the first penalty parameter adjusting the first error value and/or the second error value;

selecting the final motion vector between the first motion vector and the second motion vector based on the adjusted first and second error values.

5. An apparatus for estimating motion of a pixel block in a first frame, comprising:

a computing device, the computing device including a computer processor and computer memory;

the computing device configured to provide a plurality of operational units, the plurality of operational units including:

an adaptive motion search unit (AMSU) coupled to search a second frame, stored in computer memory, to calculate a first motion vector associated with a first matching block that corresponds to the pixel block, the first matching block including a first error value that is a minimum of at least one error criteria between the pixel block and the first matching block, the AMSU further calculating a second motion vector associated with a second matching block that corresponds to the pixel block, the second matching block including a second error value that is a minimum of the at least one error criteria between the pixel block and the second matching block;

a lattice structure detection unit (LSDU) coupled to detect, by use of the computer processor, a first lattice structure in the first frame, and to produce a lattice structure map from the detected first lattice structure, the lattice structure map including at least one pitch period value associated with at least one repeating structure in the first frame;

a motion histogram generating unit (MHGU) coupled to generate, by use of the computer processor, a first histogram for the first frame, the first histogram being derived from the first motion vector and the lattice structure map, the first histogram including a relation between the first motion vector and the at least one pitch period value; and a motion vector selection unit (MVSU) coupled to select, by use of the computer processor, a final motion vector between the first and second motion vectors based on the first and second error value.

6. The method of claim 4 further comprising storing the final motion vector in a compressed video file.

7. An apparatus for estimating motion of a pixel block in a first frame as part of a video encoding scheme, comprising:

an adaptive motion search unit (AMSU) coupled to search a second frame to calculate a first motion vector associated with a first matching block that corresponds to the pixel block, the first matching block including a first error value that is a minimum of at least one error criteria between the pixel block and the first matching block, the AMSU further calculating a second motion vector associated with a second matching block that corresponds to the pixel block, the second matching block including a second error value that is a minimum of the at least one error criteria between the pixel block and the second matching block;

a lattice structure detection unit (LSDU) coupled to detect a first lattice structure in the first frame and to produce a lattice structure map from the detected first lattice structure, the lattice structure map including at least one pitch period value associated with at least one repeating structure in the first frame;

a motion histogram generating unit (MHGU) coupled to generate a first histogram for the first frame, the first histogram being derived from the first motion vector and the first lattice structure map, the first histogram including a relation between the first motion vector and the at least one pitch period value; and a motion vector selection unit (MVSU) coupled to select a final motion vector between the first and second motion vectors based on the first and second error value; and wherein at least one of the AMSU, LSDU, MHGU, and MVSU is an application specific integrated circuit.

* * * * *